July 10, 1951  B. AMES  2,560,062
PORTABLE SUPPORT FOR INVALIDS
Original Filed Feb. 2, 1944  3 Sheets-Sheet 2
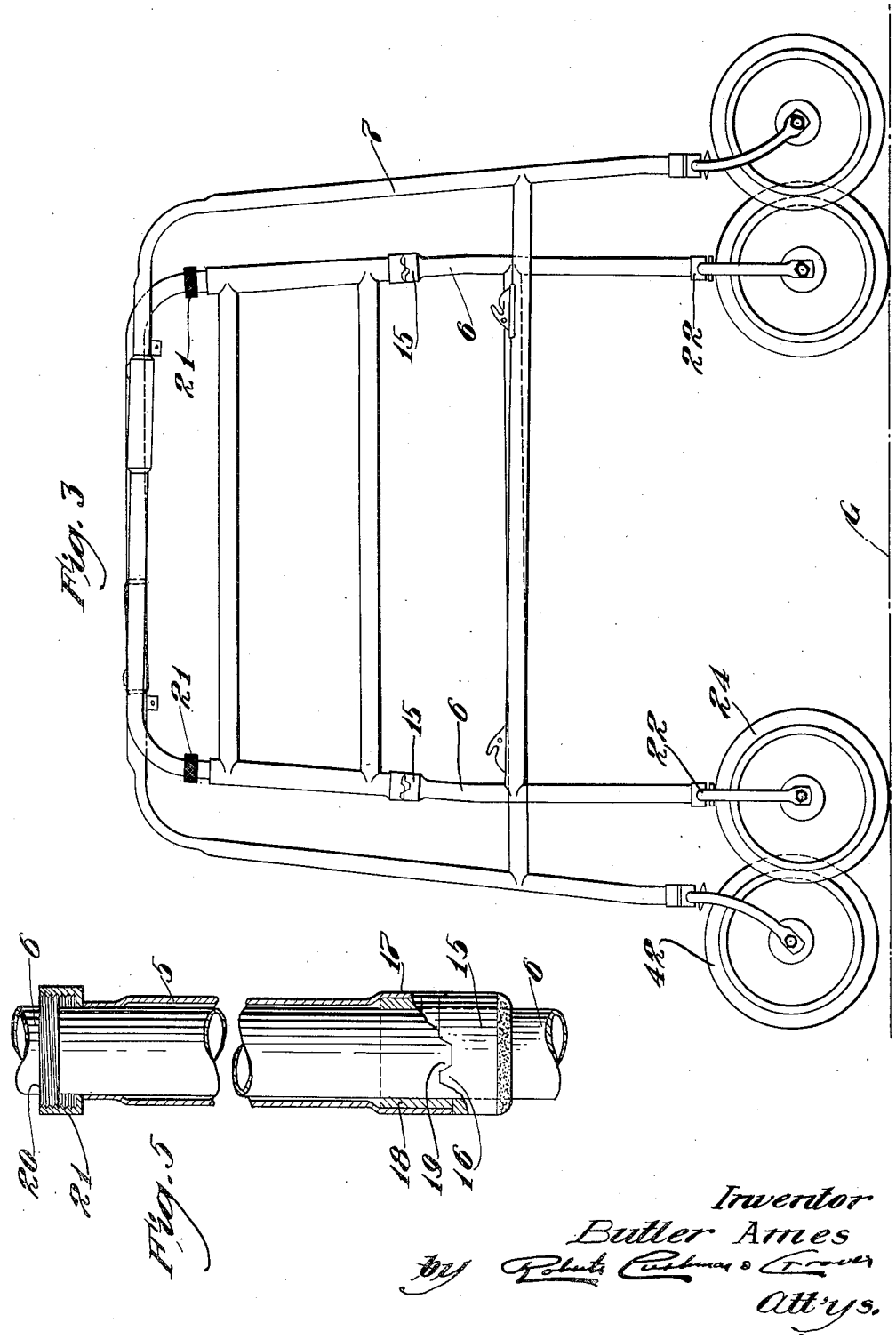
Inventor
Butler Ames

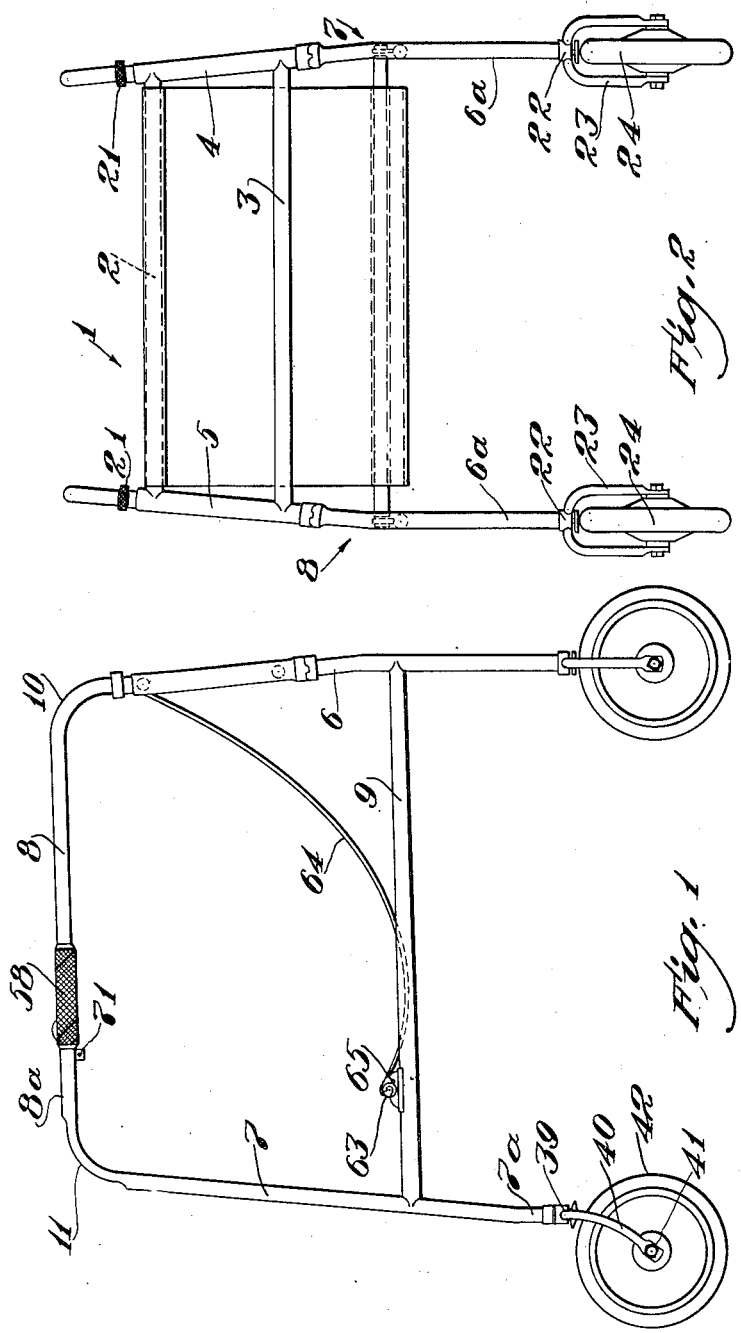

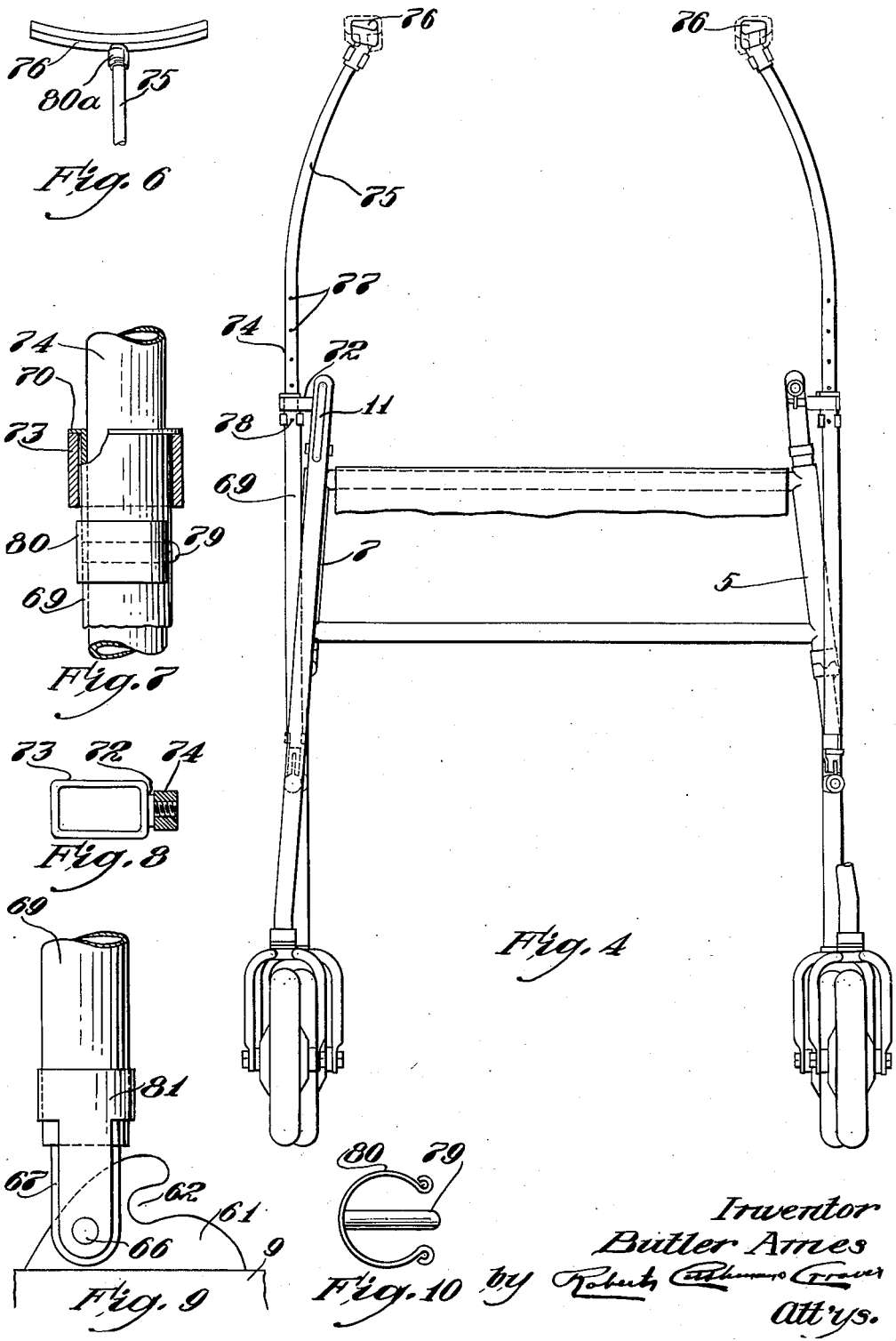

Patented July 10, 1951

2,560,062

UNITED STATES PATENT OFFICE 2,560,062

PORTABLE SUPPORT FOR INVALIDS

Butler Ames, Boston, Mass., assignor to The Walkabout Company, Lowell, Mass., a corporation of Massachusetts Original application February 2, 1944, Serial No. 520,745. Divided and this application February 20, 1947, Serial No. 729,736

3 Claims. (Cl. 155—22)

This invention pertains to portable supports for individuals, for example persons incapacitated from walking by reason of infirmity or age, or those liable to be subjected to extreme weariness from prolonged standing or walking, and relates more particularly to an improved support of the general type disclosed in United States patent to Ames No. 2,282,689, dated May 19, 1942, the present application being a division of application Serial No. 520,745, for Portable Support, upon which Patent No. 2,437,778 issued on March 16, 1948.

The support of the present invention, like that disclosed in the patent, comprises two substantially rigid supporting units normally disposed in spaced substantially parallel relation and between which the user stands or sits, and a back to which both supporting units are hinged. The frames of the supporting units and back are in general similar to the corresponding parts of the patented device, being made of thin and light but very stiff and rigid tubing. The top or hand supporting bar or rail of each supporting unit is preferably integrally continuous with the front and rear legs of the respective unit, while the lower, stretcher bar of each supporting unit is welded to the legs, and the constituent bars of the back are welded together. The hinge connections between the supporting units are likewise in general similar in structure and function to the corresponding portions of the patented device, being so designed as to permit the supporting units to be swung through arcs of approximately 180° and placed in parallel folded positions for convenience in shipping or storing the support.

In the device disclosed in the aforesaid patent, the support is provided with wheels at its forward end only and normally rests upon skids at its rear end. These skids are effective in preventing the device from getting out of control of the user, for instance when on an incline, but on the other hand make is necessary to expend more energy than may sometimes be desirable in propelling the device.

Objects of the present invention are to provide an improved support of the type disclosed in said patent but which is easy to propel, which is light in weight and foldable for transportation; to provide a four-wheeled support having swiveled front wheels thereby to facilitate steering it; to provide a four-wheeled support which is safe for the user even on an incline; to provide a wheeled support having brakes which are readily controlled by the user even though the user be weak or infirm; to provide a wheeled support which may safely be left standing alone without danger that it will run away; to provide a support which is firm and stable; to provide a support having provision for the optional employment of crutch devices to assist in supporting the user; to provide wheel-supported crutches which are independently adjustable as to height and relatively movable toward and from each other to accommodate users of different sizes and to yield to bodily movements; and to provide a wheeled support having swiveled front wheels but so designed that the front wheels do not drag when the device is folded for transportation.

Other and further objects and advantages of the invention will be pointed out in the following more detailed description and by reference to the accompanying drawings wherein:

Fig. 1 is a side elevation of the improved support set up and ready for use, but omitting the crutches;

Fig. 2 is a rear elevation of the device shown in Fig. 1;

Fig. 3 is a side elevation of the device of Fig. 1 as it appears when folded for storage or transportation, the seat being omitted;

Fig. 4 is a front elevation of the device showing the crutches in operative position, the seat being broken away;

Fig. 5 is a fragmentary, diametrical section to larger scale, showing details of the hinge means which connects the back with each supporting unit;

Fig. 6 is a side elevation of the upper part of the crutch staff showing the arm-pit pad;

Fig. 7 is a fragmentary elevation, partly in diametrical section, of the upper part of the crutch staff socket and the lower part of the restraining bracket;

Fig. 8 is a fragmentary plan view of the crutch-restraining bracket;

Fig. 9 is a fragmentary side elevation of the stretcher bar of one of the units showing the lower end of the crutch socket attached thereto; and Fig. 10 is a plan view of a connecting pin having a retaining ring associated with it.

Referring to Fig. 2 of the drawings, the numeral 1 designates the back of the support. This back comprises parallel, substantially horizontal stretcher bars 2 and 3 which are rigidly united at their opposite ends, for example by brazing or welding, to a pair of hinge sleeves 4 and 5 forming a part of the hinge means which connects the back to the respective supporting units. The supporting units are alike and each comprises a rear leg 6, (Figs. 1 and 3) a front leg 7 and an upper or hand-supporting rail comprising the aligned members 8 and 8ª, united by a tubular guide as more fully described in the above patent to Ames No. 2,437,778. Each supporting unit also comprises a stretcher bar 9 spaced a substantial distance below the hand-supporting rail and substantially parallel to the latter, the opposite ends of the stretcher bar being rigidly united to the rear and front legs 6 and 7 by welding, brazing or the like. The parts 6, 7, 8, 8ª and 9, as well as the top and bottom rails 2 and 3 of the back, are preferably formed of thin but very rigid and strong metal tubing, for example drawn stainless steel tubing. As here illustrated the rear leg 6 is integrally joined with the part 8 by a smoothly bent portion 10 of the tubular material, while the front leg 7 is integrally united to the part 8ª of the hand-supporting rail by the smooth bend 11.

The front and rear legs 6 and 7 of the unit diverge downwardly away from each other, the upper portions of these legs preferably making an angle of approximately 5¼° with the vertical. Likewise the hinge members 4 and 5 of the back diverge downwardly from each other making a similar angle of 5¼° with the vertical so that the axes of these hinge sleeves 4 and 5 make angles of approximately 84¾° with the connecting rails 2 and 3. The downward divergence of the hinge sleeves 4 and 5 provides for stability of the device by spreading the supporting units apart at their lower portions, while the inclination of the legs of the unit causes the front wheels of the two units to be elevated from the floor when the device is folded as shown in Fig. 3, so that only two of the wheels, that is to say the rear wheels of the device, then contact the floor. This prevents the freely swiveling front wheels from interfering with the transportation of the folded device when wheeling it along on its rear wheels in the position of Fig. 3.

As illustrated in Fig. 5, the rear leg 6 of each unit extends down through a corresponding hinge sleeve 5 of the back member located above the stretcher bar 9 of each unit. Each leg 6 is provided with a fixed collar or annulus 15 welded to the leg and having its upper edge shaped to provide teeth 16 of truncated triangular shape. The lower end of the hinge sleeve 5 is swedged to increase its diameter as shown in Fig. 5 and within this enlargement there is fixed, as by brazing, a ring or annulus 18 whose lower edge is shaped to provide teeth 19, also of truncated triangular shape and designed to fit normally within the space between the teeth 16 thus to prevent relative rotation of the leg 6 and the sleeve 5. Just above the upper end of the sleeve 5, the leg 6 is provided with an externally screw-threaded flange 20 with which engages a peripherally knurled nut 21 having its lower end normally in engagement with the upper end of the sleeve 5 so as to prevent relative axial movement of the sleeve 5 and the leg 6. However, by retracting the nuts 21, the entire back of the device may be raised sufficiently to disengage the teeth 16 and 19, whereupon the supporting units may be swung about the axes of the legs 6 so as to dispose the supporting units in substantially parallel planes with the back interposed between them as shown in Fig. 3. The front and rear legs of the device are so bent that their lower portions 6ª and 7ª (Figs. 1 and 2) are substantially vertical.

The lower end of each rear leg 6 is provided with a fixed collar 22 brazed or otherwise rigidly secured to the leg, such collar constituting the upper part of a forked bracket 23 (Fig. 2) having bearings for the rear wheel 24. This rear wheel may be of conventional wire-spoke construction, having a rubber or other resilient tire 24. As above noted, the collars 22 are rigidly secured to the lower ends of the legs 6 and the brackets 23 are so arranged that the planes of the rear wheels are always parallel. A bracket 40 is swiveled to the lower end of each front leg and provides bearings 41 for a wheel having a resilient tire 42, preferably of the same diameter as the tire of the rear wheel. The brackets 40 are free to turn relatively to the front legs of the respective units so that each front wheel is free to swivel.

Each of the stretcher bars 9 is provided with a fixed bracket 61 (Fig. 9) near its forward end, each bracket having a recess 62 which is designed to receive a pin provided at the end of a bar 63 (Fig. 1) extending across the forward edge of a flexible seat member 64. The upper edge of this seat member is secured to the upper rail of the back. When in use, the bar 63 is engaged with the recesses or slots 62 of the brackets, thus holding the seat in operative position as shown in Fig. 1, but when the seat is not to be used the bar 63 is disengaged from the brackets 61 and the flexible seat material may be wound about the bars 2 and 3 of the back. As here illustrated, each bracket 61 is provided with a transverse opening 65 (Fig. 1) which is designed to receive a pin 66 (Fig. 9) passing through the forked lower end of a plug 67 which is fixed within the lower end of a tubular crutch socket 69. This crutch socket is preferably of thin rigid tubing and of a length (Fig. 4) such as to reach up substantially to the level of the corresponding hand-supporting rail and is preferably provided at its upper end with a radial flange 70 (Fig. 7). Each hand-supporting rail is provided with a bracket member 71 (Figs. 1 and 8) (which may be removed if desired) to which is secured or with which is integral a horizontal member 72 (Fig. 8) provided with an elongate looped portion 73 (Figs. 7 and 8) which embraces the upper part of the crutch socket 79 at a point just below the flange 70. The loop 73 is of such length as to permit the upper part of the crutch socket to move laterally within the loop, the crutch socket swinging about its point of connection to the bracket 61. The crutch socket is designed to receive the lower, substantially straight portion 74 of a crutch staff whose upper end portion 75 is preferably curved. At its upper end each crutch socket is designed to receive a plug projecting from an arm-pit rest or pad 76. The straight lower portion of each crutch staff is furnished with a series of spaced openings 77, and the upper part of each crutch socket is furnished with a single opening 78 (Fig. 4). A retaining pin 79 (Fig. 7) may be passed through the opening 78 of the socket and through any selected one of the openings 77 of the crutch staff thereby to hold the crutch staff in vertically adjusted position. Preferably each pin 79 is, as illustrated in Fig. 10, riveted to the closed side of a split resilient ring 80. With this arrangement, when the pin is passed through the openings 77 and 78, the split ring 80 is brought into embracing relation to the socket and thus effectively holds the pin in position until sufficient force is applied to spread the ring 80 and permit the pin to be withdrawn. The arm-pit rest 76 is removably secured to the upper end of the crutch staff by a similar pin and ring 80ª. The pin 66 which unites the lower end of the crutch staff socket to the bracket 61 is likewise preferably carried by a split ring 81 (Fig. 9) which embraces the lower end 69 of the socket.

In use, the crutch staffs are disposed as shown in Fig. 4, so that their curved upper parts are concave toward each other. This disposes the arm-pit pads 76 nearer to each other than the hand-supporting rails of the respective units so that the arm-pit pads are conveniently located for the user whose arms extend downwardly in diverging relation and whose hands grip the hand-supporting rails. Since the sockets 69 may swing outwardly or inwardly to a limited extent, the position of the pads 76 may vary in accordance with the size of the user and the user is given much more freedom of movement than though the pads were rigidly fixed in position. By removing the pins 79 the crutch staffs may be adjusted vertically to accommodate users of different heights.

While the device is shown in Fig. 4 as provided with crutches, it is obvious that the crutches may be removed either by removing the staffs from their sockets or by removing the sockets from the brackets 61 and 72. If desired the brackets 72 may also be removed from the arm-supporting rails.

In the normal use of the device the two supporting units are disposed so that they are substantially at right angles to the plane of the back, being held in this position by the tooth members 16 and 19 of the hinge means. In this position the operator may stand or sit between the supporting units and may propel himself along in any desired direction, supporting a portion or all of his weight upon the wheels. Since the front wheels readily swivel it is easy to guide the apparatus in any direction. The provision of the brakes makes it possible to provide four wheels for the device without any danger that it will run away and injure the occupant.

When the device is to be stored, or when it is to be transported from place to place (when not in actual use) the knurled nuts 21 are loosened, the retaining teeth 16 and 19 disengaged and the supporting units swung in opposite directions about the hinge means until the supporting units lie at the opposite sides of the back and in substantially parallel planes. By reason of the inclination of the hinged axes this folding operation raises the front wheels from the ground G as shown in Fig. 3, so that the device may be trundled along upon the rear wheels 24 without danger that the swiveling front wheels 42 will come into contact with the ground and thus impede motion of the device.

Preferably, as hereinabove described, each of the four wheels is provided with a brake, it is contemplated that one pair of brakes might be omitted if desired. Likewise the seat and crutches may be omitted if it be desired to provide a simpler and less expensive device for more limited use.

While a certain desirable embodiment of the invention has here been shown and described by way of example, it is to be understood that the invention is not necessarily limited to the precise details of construction here shown but is to be regarded as broadly inclusive of any modification or rearrangement falling within the terms of the appended claims.

I claim:

1. A crutch support comprising in combination a pair of rigid frames, each having a substantially horizontal hand-supporting rail and a stretcher bar spaced below and substantially parallel to each respective hand-supporting rail, said frames normally being substantially parallel and spaced apart sufficiently to permit a person to stand between them, means connecting the frames, a vertically elongate, tubular crutch support mounted on each frame, each socket being constructed and arranged to receive the lower portion of a crutch staff, each socket having a transverse aperture at its lower end, a bracket fixed to the stretcher bar of each carrier frame and a pivot pin passing through the aperture at the lower end of each crutch socket and pivotally uniting said socket to the bracket on the stretcher bar, each socket, when in operative position, reaching upwardly to the hand-supporting rail, means carried by the hand-supporting rail for limiting swinging movement of the upper end of the socket relative to the rail, a crutch staff having its lower portion telescoped within each socket, each staff having an arm-pit pad at its upper end, and means for adjusting each crutch staff axially of its socket, thereby to vary the height of its arm-pit pad.

2. A portable wheeled support for invalid or similar use in the form of a frame having spaced supporting members between which the invalid may stand, each member having a hand rail which may be gripped to assist the invalid in walking, characterized in that each member has associated therewith an underarm support engageable beneath the armpit, each underarm support comprising a staff removably mounted on the member, a vertically elongate staff socket for receiving the lower end of the staff, pivot means at the lower end of the socket, pivotally anchoring it to the member, a bracket fixed to the hand rail above the pivot means, and an elongate loop fastened to the bracket outward of the member, said loop surrounding the socket and permitting movement thereof and the staff to and from the member.

3. A portable and foldable crutch support including a pair of rigid frames, each having a substantially horizontal hand supporting rail and a stretcher bar spaced below and substantially parallel to each respective hand supporting rail, said frames normally being substantially parallel and spaced apart sufficiently to permit a person to stand between them, characterized in that each frame has a vertically elongate, tubular socket mounted thereon, constructed and arranged to receive the lower portion of a crutch staff, that there is means pivotally connecting the lower end of each socket to one of the stretcher bars, respectively, that the upper end of each socket is disposed adjacent to the hand rail and is provided with a radial flange, that the hand supporting rail has a rigid elongate loop member underlying the flange of the socket and embracing the socket, thereby permitting the upper end of the socket to swing outwardly from the rail to a limited extent, that a crutch staff is telescoped within the socket and has an armpit pad at its upper end, that the staff has a series of vertically spaced transverse openings therein and the socket has a transverse opening with which any one of the openings of the staff may be aligned, and that there is a removable pin adapted to be passed through the opening in the socket and a selected opening in the staff, thereby to hold the staff at a desired adjusted heightwise position.

BUTLER AMES.

REFERENCES CITED

The following references are of record in the file of this patent:

UNITED STATES PATENTS

| Number | Name | Date |
|---|---|---|
| 1,394,224 | Scott | Oct. 18, 1921 |
| 1,949,163 | Kasten | Feb. 27, 1934 |
| 2,129,260 | Bowser | Sept. 6, 1936 |
| 2,224,246 | Ames | Dec. 10, 1940 |
| 2,282,689 | Ames | May 12, 1942 |
| 2,437,778 | Ames | Mar. 16, 1948 |